United States Patent [19]

Hush et al.

[11] 4,104,098

[45] Aug. 1, 1978

[54] METHOD AND APPARATUS FOR CURING AND REINFORCING HOSE

[75] Inventors: James M. Hush, Evergreen; Donald J. McPhee, Littleton, both of Colo.

[73] Assignee: The Gates Rubber Company, Denver, Colo.

[21] Appl. No.: 779,213

[22] Filed: Mar. 18, 1977

[51] Int. Cl.² ............................................. B65H 81/00
[52] U.S. Cl. ................................... 156/149; 156/172; 156/244.12; 156/272; 156/380; 156/393; 156/498; 219/10.55 A; 264/25; 264/103; 264/209
[58] Field of Search ............... 156/149, 180, 272, 274, 156/380, 392, 393, 244, 498, 499, 500, 171–174, 175, 430–432, 441; 264/25, 103, 209, 45.9, 257, 258; 219/10.57, 10.55 A, 10.55 M

[56] References Cited

U.S. PATENT DOCUMENTS

| | | | |
|---|---|---|---|
| 1,426,672 | 8/1922 | Radford | 156/96 |
| 2,974,713 | 3/1961 | Hydrick, Jr. | 156/393 |
| 3,038,523 | 6/1962 | Merck et al. | 156/393 |
| 3,503,823 | 3/1970 | Richart et al. | 156/273 |
| 3,684,622 | 8/1972 | Goldsworthy | 156/180 |
| 3,769,127 | 10/1973 | Goldsworthy et al. | 156/172 |
| 3,851,131 | 11/1974 | Johnston et al. | 219/10.55 A |
| 4,003,774 | 1/1977 | Lebet et al. | 156/180 |
| 4,010,054 | 3/1977 | Bradt | 156/173 |

*Primary Examiner*—Douglas J. Drummond
*Assistant Examiner*—Michael W. Ball
*Attorney, Agent, or Firm*—Curtis H. Castleman, Jr.; Raymond Fink; H. W. Oberg, Jr.

[57] ABSTRACT

A partially cured flexible vulcanizable core useful in the manufacture of hose, for instance, is produced by passing the vulcanizable core through a microwave zone while simultaneously contacting only the outer surface of the core with a cool stream of fluid, so that the core becomes substantially cured with the exception of a layer at the outer surface of the core, which remains substantially uncured.

17 Claims, 4 Drawing Figures

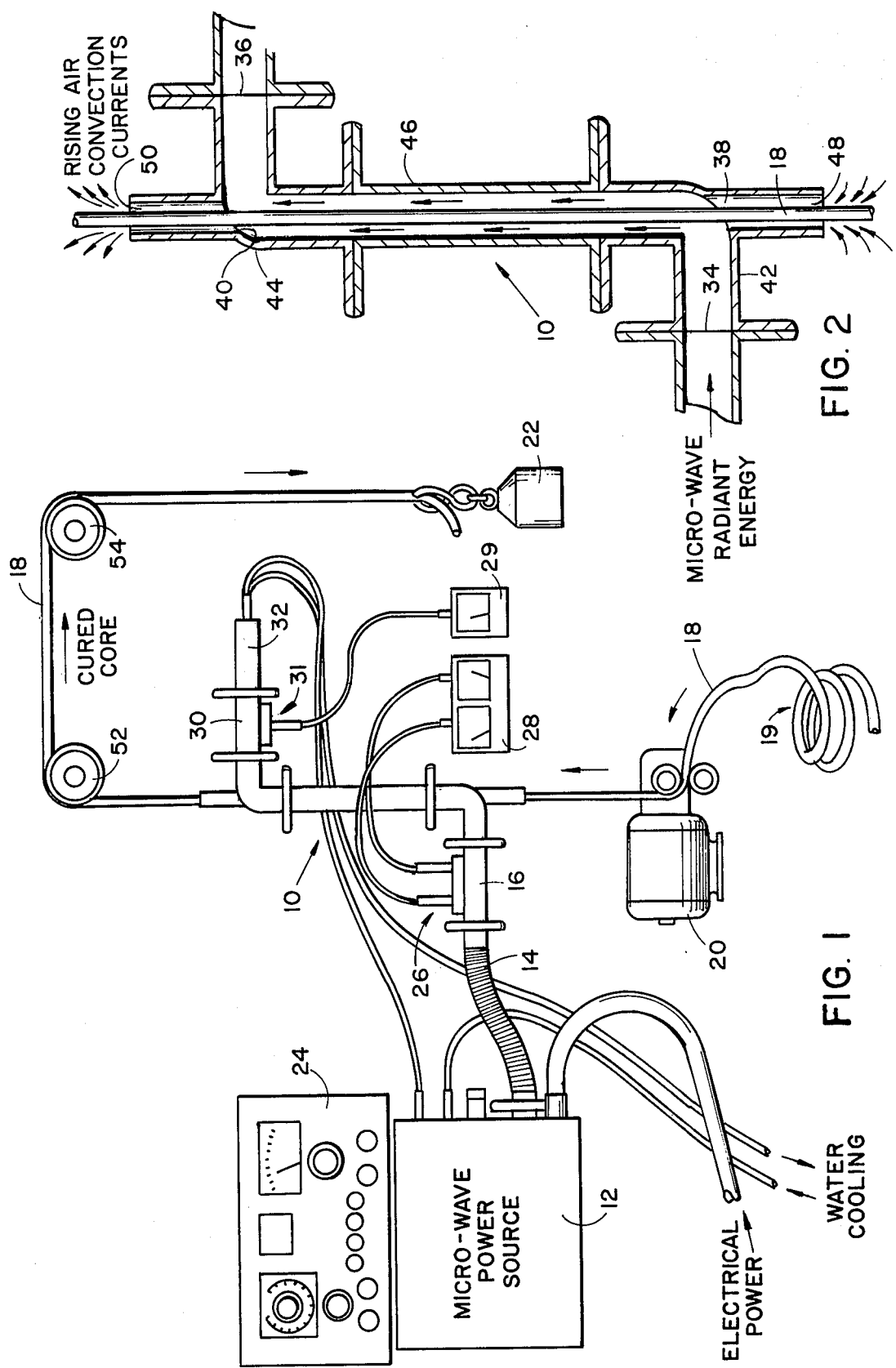

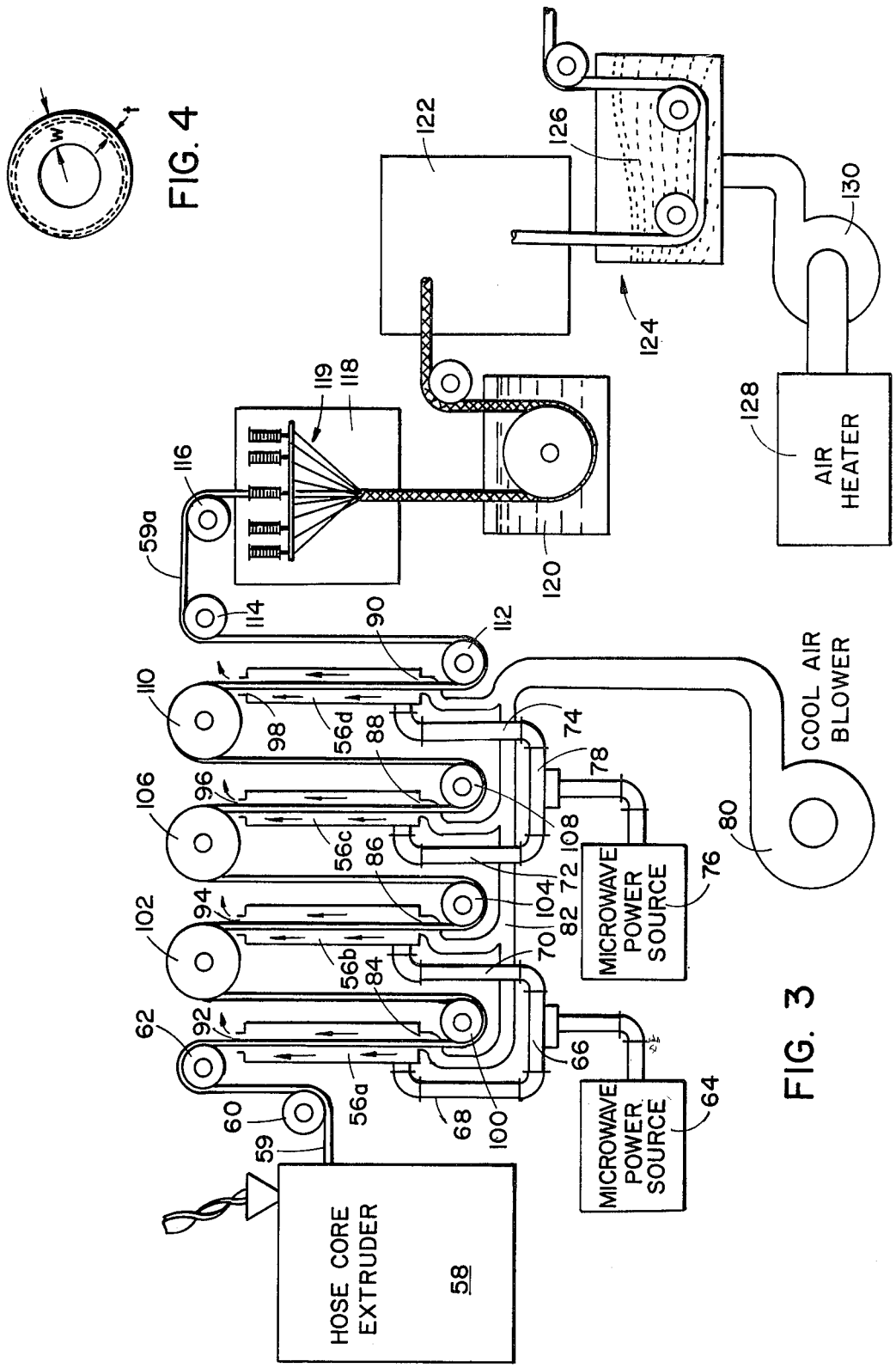

METHOD AND APPARATUS FOR CURING AND REINFORCING HOSE

BACKGROUND OF THE INVENTION

This invention relates to the manufacture of tubular articles such as hose, and more particularly to tubular articles comprising an inner core formed of vulcanizable elastomeric material, such as natural and synthetic rubbers.

In the manufacture of reinforced hose having a vulcanizable core tube, it is customary to twine the reinforcement in the form of a braid, spiral or the like about the uncured elastomer core. The reinforcement may be treated with an adhesive dip. A cover may be optionally extruded over the reinforced core tube, and then the green composite cured (vulcanized) in customary fashion employing, for instance, open steam or lead-press methods. For many applications the foregoing process is less than satisfactory since the uncured core with neckdown, stretch, flatten, or otherwise experience a diameter or shape change during braiding or other application of reinforcement. This results in an uneven braid pattern and angle and undesirable change in the shape of the core tube, and particularly a loss in roundness. The neckdown problem makes it more difficult to braid or spiral the reinforcement at the locking angle of 54.7°.

To overcome the problem of shape change associated with the above-described method, normally one of two techniques has been employed. First, the core is fully cured prior to applying the reinforcement thereover. The severe drawback with this approach, however, is a loss of adhesion between the reinforcement and the cured core, so that the yarn becomes loose on the core and tends to fray out or flare at the cut end of the hose. The second solution has been to employ a flexible rubber supportive mandrel internally of the core during application of the reinforcement. When the above problems are primarily overcome when using the mandrel, there still tends to be a degree of neckdown of the core since its entire wall section is uncured, relatively soft, and lacking in resiliency. Moreover, the use of the mandrel adds considerable expense to the process.

It is the primary object of the subject invention to overcome the problems of the prior art, and to produce a core whose cross section and length are held virtually constant during twining of the reinforcement about the core, without sacrificing adhesion between the reinforcement and core.

SUMMARY OF THE INVENTION

Briefly described, in one aspect of the invention, a method is described for making flexible reinforced tubular articles such as hose having a core formed of vulcanizable elastomeric material, including the steps of: (1) establishing at least one microwave applicator confined zone having an inlet and outlet for passage of an at least partially uncured vulcanizable core; (2) passing the vulcanizable core through the confined zone while substantially simultaneously (a) exposing the core to an applied microwave field, and (b) contacting substantially only the outer surface of the core with a cool stream of fluid within the confined zone, whereby the core becomes substantially cured with the exception of a layer at the outer surface of the core which remains substantially uncured; (3) applying reinforcement to the uncured outer surface of the core; and (4) adhering the reinforcement to the core.

According to another aspect, there is disclosed apparatus for carrying out the method, including (1) at least one microwave applicator confined zone having an inlet and outlet for through passage of an uncured vulcanizable core; (2) means coupled to the confined zone for supplying a microwave field to the confined zone; and (3) means for contacting the surface of the uncured core with a cooling fluid simultaneously as the core is passed through the confined zone and exposed to the microwave field.

In a further aspect, the partially cured core useful in the manufacture of the reinforced tubular articles is disclosed.

BRIEF DESCRIPTION OF THE DRAWINGS

Certain preferred aspects of the invention will be described in conjunction with the accompanying drawings, wherein like numerals designate like parts, and wherein:

FIG. 1 is a schematic view of apparatus for carrying out the method of the invention, using a single stage microwave applicator;

FIG. 2 is a partial sectional enlarged view, of the microwave applicator confined zone of FIG. 1;

FIG. 3 depicts a schematic flow diagram for production of hose according to the process utilizing multiple stage power applicators; and FIG. 4 illustrates schematically a cross section of a core cured in accordance with the method of the invention.

PREFERRED EMBODIMENTS OF THE INVENTION

Referring first to FIGS. 1 and 2 of the drawings, apparatus for carrying out the method of the invention is shown generally comprising a microwave applicator 10 of generally S-shape, a microwave power source (magnetron) 12 coupled to the microwave applicator via flexible wave guide 14 and detector zone 16, and drive means for passing core 18 through the microwave applicator including gear motor 20 and weight 22.

The magnetron may be of any suitable size, according to the size of the hose to be cured. The output of the power source is regulated by control system 24. At the inlet side to the applicator zone 10 is positioned detector 26 which measures both the forward and reverse directional power existing in zone 16, and which is displayed in meter bank 28 so that the net power applied to the hose load can be determined. At the outlet side of the wave guide applicator zone is positioned another detector 31, which measures the forward power not absorbed by the hose (displayed by meter 29), from which, together with the data supplied by meter bank 28, is supplied information enabling determination of the net power absorbed by the hose. Any microwaves found in zone 30 will be absorbed by water trap 32. Film barrier 34, 36 made of polyester film, for instance, which is transparent to the microwaves, acts as a film moisture barrier.

The microwave applicator, here illustrated as one possible embodiment of the invention, is formed of a substantially S-shaped confined zone having inlet 38 and outlet 40 of larger diameter than the hose and of sufficient length for the substantial prevention of escape of microwave energy, said outlets permitting through passage of the hose during performance of the method.

Those skilled in the art will appreciate that the wave guide confined zone 10 is designed to provide two opposingly oriented regions of increased field concentrations, namely the elbow, wherein the electric vector of the microwave radiation is substantially optionally oriented parallel to the hose axis, thereby maximizing the uniform application of the microwaves to the passing hose. The major part of the microwave heating has been found to occur in the regions of the 90° elbows 42 and 44, while the straight section 46 has been found to provide additional area for the cool air to chill the outer surface of the traveling hose. The S-shaped orientation of the 90° elbows has been found to permit more even application of the microwave energy than the alternative U-shape configuration. Those skilled in the art will appreciate that other applicators based on different resonance modes of the microwave energy may be more efficient in the uniform and extended application of the microwave energy where higher traveling speeds of the hose are used.

In accordance with one aspect of the invention, inlets 38 and 40 include respective annuli 48, 50 which provide the principal means for admitting cooling fluid (air in this case) to the surface of the core 18 during operation of the apparatus. In this embodiment, the annular openings 48, 50 produce a chimney effect, with cool air being admitted at the bottom air intake side at 48, and then rising by convection current and being expelled through annuli 50, in a substantially vertical direction cocurrent with the direction of hose travel.

In operation, fully or partially uncured core 18 is supplied from coil 19, and admitted by constant speed gear motor 20 vertically into the inlet side 38 of the confined zone 10. With the microwave power source fully on, and the power levels properly determined in accordance with the size of the hose and the power readings from dials 28 and 29, microwave heating is established within the wave guide confined zone 10. As the uncured core 18 enters the confined zone, and passes beyond inlet 38, the core is subjected to microwave radiant energy which, in known manner, induces heating of the elastomeric stock. The stock is compounded, in known manner, so that the microwave energy is effective to induce sufficient heating.

As the core then proceeds upwardly through the confined zone 10, the core temperature rises throughout the body of the core due to the absorption of microwave energy. However, because of the chilling air surrounding the surface of the core, as a result of the air convection currents passing upwardly through the confined zone as illustrated by the arrows of FIG. 2, the surface of the core is chilled therefore substantially confining the temperature rise in the core to its radially inward portion. In this embodiment, the cooling fluid applied to the surface of the core is provided quite simply by the rising convection current of room air, whose temperature is substantially below the curing temperature of the elastomeric material of the core. In general, the cooling fluid may exist at any temperature which is substantially below the curing temperature of the core. It is preferred that the cooling fluid have a combination of temperature and flow rate which will maintain the surface of the core at a temperature sufficiently low that preferably at least about 1% and at most about 8% of its wall thickness below its outer surface is cooled below the minimum vulcanization temperature of the core.

As the core inner body becomes substantially cured, it is drawn through outlet 40 of the confined zone and over pulleys 52, 54 with the aid of weight 22, or alternatively coiled up on a suitable take-up drum. The flow-through rate of the core may vary depending upon the mass of the hose, power output of the magnetron, efficiency of the applicator zone, "lossiness" (microwave absorption efficiency) of the stock, etc., although in general rates preferably from about 10 to about 100 feet per minute are satisfactory. Temperature and flow rate of the cooling fluid must be adjusted to the flow-through rate of the core so that the approximate surface of the core is maintained well below the cure temperature of the core consistent with the duration of the exposure of the microwave power.

The exterior surface of the cured core after exiting the microwave applicator zone will be uncured, producing an outer tacky surface. More preferably, the core will be uncured to a depth at least just beneath the surface, shown schematically (not to scale necessarily) as thickness $t$ in FIG. 4. Preferably, the depth from the surface of the uncured thickness $t$ will be no more than about 40 percent of the core wall thickness $w$, more preferably no more than about 15 percent of the core wall thickness, and most preferably from about 1 to about 8 percent of the core wall thickness. In general, it is preferred that at least the radially inner portion constituting the volumetric majority of the core member be substantially cured and resilient, while at least the outer surface of the remainder of the core be substantially uncured, with portions of the core wall therebetween being in any desired state of full or partial cure. As an illustrative example, it will be satisfactory for many applications if the outer surface of the core, to a depth from about 0.004 to about 0.03 inches from the surface, remains uncured.

The partially cured core has sufficient rigidity to prevent neckdown, stretching, or collapsing during braiding, spiralling or other reinforcement applications, and yet presents an uncured outer surface to obtain the necessary adhesion with the reinforcement, treated or untreated, during subsequent curing.

In the embodiment of FIG. 3, a production line flow diagram is shown for the manufacture of hose employing multiple stage microwave applicator apparatus. Four cascaded microwave applicator zones 56a, 56b, 56c, 56d are arranged serially, to progressively increase the cure state of the core as it passes successively from one zone to the next. In general, any number of microwave applicator stages may be employed, depending upon the rate of throughput of the core, and the desired degree of microwave heating and air surface cooling desired to produce a specific configuration of partially cured core.

In the operation of the apparatus of FIG. 3, uncured rubber stock compounded to accept microwave heating is delivered to a hose core extruder 58 from which uncured core tubing 59 is delivered via pulleys 60, 62, either of which may be driven, to the first microwave power applicator confined zone 56a. Microwave power is supplied from magnetron power source 64, through manifold 66 and passageway 68 designed as wave guides, and finally introduced into the side of the confined zone 56a as shown. In similar manner, microwaves are introduced into confined zone 56b via manifold 66 and wave guide 70. Similarly, a second microwave power source 76 supplies microwaves to confined zones 56c and 56d via manifold 78 and wave guide lines 72, 74, respectively.

As the uncured hose core passes through the first microwave applicator confined zone 56a, a partial curing of the internal portion of the hose is enabled, and since substantially no excess power is employed, a water trap is not required. In accordance with the invention, cooling air from cool air blower 80 is supplied to manifold 82 which in turn supplies cool air into respective inlets 84, 86, 88, 90 at the exit point of each of the confined zones. The blower 80 forces the air countercurrent to the direction of hose travel and generally in the direction of the arrows shown until the air exits through the enlarged concentric annuli 92, 94, 96, 98.

The core is successively driven about rollers 100-112, through each of the successive stages, until the core is cured to the desired extent. As in the embodiment of FIGS. 2 and 3, the surface of the core 59a, to the desired depth, will be substantially uncured and present a tacky, green surface.

The thus formed core with a cured interior portion, and an uncured surface is sent via rollers 112-116 through braider 118 which encases the hose core with a suitable reinforcing yarn 119, wire, or the like, and then the reinforced core is introduced into dip tank 120 containing a yarn-to-rubber curable adhesive. Alternatively, the yarn may have been pretreated with an adhesive composition, or the rubber components of the hose could be compounded with a suitable adhesive admixed with the rubber material, or the hose surface coated with latex prior to braiding, etc. It will be clear to those skilled in the art that other methods for adhering the reinforcement to the uncured surface of the core may be employed without departing from the scope of the invention.

No mandrel is needed to support the core during application of the reinforcement. No neckdown of the core is experienced. However, a mandrel may be used if dictated by the circumstances without sacrificing compatibility with the process.

The reinforced hose with applied adhesive may then be simply air dried to complete the curing of the exterior surface of the core and/or the adhesive (if curable, such as latex), or may be externally heated, e.g., with a hot air tunnel, to complete the vulcanization process at the exterior (only) of the hose composite.

Various other alternatives in the method may be employed at this stage, shown generally at 122. For instance, if desired, a cover may be placed (extruded) over the reinforced core. The cover may be of a desired material, such as a rubber-like vulcanizable material, or alternatively a self-curing cover which may suitably be formed of a thermoplastic, preferably elastomeric material such as polypropylene or polyvinylchloride, for instance. In the event a self-curing thermoplastic is extruded over the reinforced core as a cover member, the residual heat produced by the cover extrusion operation, which operation may be conducted at from about 300° to 500° F., for instance, can be used to supply the needed heat units to finish curing the exterior surface of the core tube 59.

In the alternative event that a cover of vulcanizable rubber-like material is employed, the resultant covered hose composite may be introduced into zone 124 for completion of curing. For this purpose, fluidized bed 126 may be employed, with the necessary hot air supplied from heater 128 and blower 130. Various other alternative curing means may be employed, such as radiant heat, hot air, open steam, microwave, and the like. It is preferred to use a curing method, such as the fluidized bed cure shown, which supplies heat to the hose composite by a natural gradient from the outside of the hose, lessening inwardly. In this manner, the heat curing units are supplied to the outer hose cover and outer surface of the core where uncured material is present, as opposed to interiorly of the hose composite wherein the inner portion of the hose core is already cured according to the invention.

As used herein, "rubber-like materials" is intended to cover natural rubber, synthetic rubbers such as SBR, neoprene, butyl rubber, EPDM, and the like, as well as other vulcanizable elastomers.

It should be understood that the invention is capable of a variety of modifications and variations which will become apparent to those skilled in the art upon a reading of the subject specification, and are intended to be covered by the claims appended hereto.

What is claimed is:

1. A method of making flexible reinforced tubular articles such as hose having a core formed of curable elastomeric material, comprising:
    establishing at least one microwave applicator confined zone having an inlet and outlet for passage of an at least partially uncured core;
    passing the curable core through the confined zone while substantially simultaneously (a) exposing the core to an applied microwave field, and (b) contacting substantially only the outer surface of the core with a cool stream of fluid within the confined zone, whereby the core becomes substantially cured with the exception of a layer at the outer surface of the core which remains substantially uncured;
    twining reinforcement on said uncured outer surface of the core; and
    adhering the reinforcement to the core.

2. The method of claim 1 wherein a curable cover member is applied over the reinforcement and the article is fully cured.

3. The method of claim 1 wherein the partially cured core together with its adhered reinforcement is subjected to air drying without any separate additional curing step.

4. The method of claim 1 wherein the fluid comprises an air stream which is passed cocurrent to the core.

5. The method of claim 1 wherein the fluid is an air stream which is passed countercurrent of the core.

6. The method of claim 1 wherein the reinforcement is applied onto the partially cured core without internally supporting the core.

7. The method of claim 4 wherein the core is passed through the confined zone in substantially a vertical direction.

8. The method of claim 1 including the additional step of extruding a self-curing thermoplastic cover over the adhered reinforcement, and wherein the thermoplastic cover is applied at an elevated temperature, providing residual heat to the surface of the core thereby substantially curing such outer surface of the core.

9. The method of claim 1 including the additional step of passing the core together with its adhered reinforcement through a hot fluid zone which supplies heat to the core by a natural gradient from the outer surface of the core lessening inwardly of the core, which completes the curing of the outer surface of the core and maintains adhesion between the core and reinforcement applied thereover.

10. The method of claim 1 wherein the outer surface of the core is contacted with the cool stream of fluid in such an amount and at such a flow rate that less that about 15 percent of the core wall thickness at the outer surface remains substantially uncured.

11. The method of claim 1 wherein the outer surface of the core is contacted with the cool stream of fluid in such an amount and at such a flow rate that less than from about 1 to about 8 percent of the core wall thickness at the outer surface remains substantially uncured.

12. The method of claim 1 wherein the outer surface of the core is contacted with the cool stream of fluid in such an amount and at such a flow rate that less than from about 0.004 to about 0.03 inches wall outer surface remains substantially uncured.

13. Apparatus for partially curing flexible curable elastomeric cores useful in the manufacture of reinforced tubular articles such as hose, comprising:
   at least one microwave applicator confined zone of generally elongated cylindrical shape and of greater internal cross dimension than the core to be cured, thereby defining an annular zone therebetween, and the confined zone having an inlet and outlet for through passage of an uncured core;
   means coupled to the confined zone for supplying a microwave field to the confined zone; and
   means for contacting the surface of the uncured core with a cooling fluid in the annular zone simultaneously as the core is passed through the confined zone and exposed to the microwave field without using a mandrel as an internal support for the core;
   means for twining reinforcement on said core downstream of said confined zone.

14. The apparatus of claim 13 further including means for passing the cooling fluid countercurrently with respect to the core within the confined zone.

15. The apparatus of claim 13 further including means for passing the cooling fluid cocurrently with respect to the direction of travel of the core within the confined zone.

16. The apparatus of claim 13 wherein a plurality of said microwave applicator confined zones are cascaded in series, with the individual microwave applicator confined zones being disconnected and distinct from one another and oriented vertically in which the core is adapted to pass in a substantially vertical direction through the confined zones.

17. The apparatus of claim 13 wherein the applicator confined zone is substantially S-shaped defined by the generally elongated cylindrical shape terminating in oppositely oriented elbows at each end.

* * * * *